United States Patent
Schader et al.

(10) Patent No.: US 9,866,019 B2
(45) Date of Patent: Jan. 9, 2018

(54) CONTROL APPARATUS FOR AN ENERGY DISTRIBUTION SYSTEM AND METHOD FOR CONTROLLING AN ENERGY DISTRIBUTION SYSTEM

(71) Applicant: ABB Technology AG, Zurich (CH)

(72) Inventors: Andreas Schader, Langen (DE);
Reinhard Bauer, Heidelberg (DE);
Silke Klose, Darmstadt (DE);
Subanatarajan Subbiah, Mannheim (DE)

(73) Assignee: ABB Schweiz AG, Baden (CH)

( * ) Notice: Subject to any disclaimer, the term of this patent is extended or adjusted under 35 U.S.C. 154(b) by 371 days.

(21) Appl. No.: 14/677,563

(22) Filed: Apr. 2, 2015

(65) Prior Publication Data
US 2015/0288180 A1    Oct. 8, 2015

(30) Foreign Application Priority Data
Apr. 3, 2014   (EP) .................................. 14001235

(51) Int. Cl.
*H02J 3/00*  (2006.01)
*H02J 1/14*  (2006.01)

(52) U.S. Cl.
CPC .............. *H02J 3/00* (2013.01); *H02J 1/14* (2013.01); *Y10T 307/406* (2015.04)

(58) Field of Classification Search
None
See application file for complete search history.

(56) References Cited

U.S. PATENT DOCUMENTS

| 7,741,730 B2 * | 6/2010 | Level | H02J 3/14 307/20 |
| 2007/0244603 A1 * | 10/2007 | Level | H02J 3/14 700/286 |

FOREIGN PATENT DOCUMENTS

EP    0 563 790 A2   10/1993

* cited by examiner

*Primary Examiner* — Long Nguyen
(74) *Attorney, Agent, or Firm* — Barnes & Thornburg LLP (57) ABSTRACT

An exemplary control apparatus for an energy distribution system includes a connection to an alternating current supply system and a plurality of predetermined loads each having an energy storage capacity and being electrically connected as by a respective switching device to the alternating current supply system for a duration of a half-wave or a whole number times said half-wave. The respective switching devices are supplied electrical energy from the alternating current supply system for a respective control time period within a predetermined common cycle time period. The start and end of the respective control time periods within the common cycle time period are established prior to the start of said common cycle time period to create a substantially constant loading graph. The optimization procedure is based at least one load in lieu of a continuous control time period having at least two non-continuous block time periods of equal total duration.

8 Claims, 6 Drawing Sheets

CONTROL APPARATUS FOR AN ENERGY DISTRIBUTION SYSTEM AND METHOD FOR CONTROLLING AN ENERGY DISTRIBUTION SYSTEM

RELATED APPLICATIONS

This application claims priority under 35 U.S.C. §119 to European application 14001235.2 filed on Apr. 3, 2014, the entire content of which is hereby incorporated by reference.

FIELD

The disclosure relates to a control apparatus for an energy distribution system that is embodied in such a manner that it includes a connection to an alternating current supply system and also includes a plurality of predetermined loads that have an energy storage capability and can be electrically connected as specified in each case by a respective switching device for the duration of a half-wave or a whole number times said half-wave to the alternating current supply system and the loads are operated at their rated output when connected.

BACKGROUND INFORMATION

It is known that it is not possible to store electrical energy without an excessive outlay and therefore the electrical energy should be generated at precisely the moment at which it is consumed by the consumers. The more it is possible to determine the consumption accurately in advance, the more efficient the scheduling of the generation of the electrical energy can be and the smaller the reserve capacity should be. The longer the schedule for generating electrical energy, the easier it is to implement. Whereas it is easy to schedule the operation by way of example of coal-fired power stations for one day in advance, this is practically not possible in a short time period of by way of example a few 100 s. It is therefore desirable that loads have as few incalculable fluctuations as possible precisely in this short time period, in other words the loading graph is optimized within a short time period to as constant a value as possible.

It is also known that loads that have an energy storage capability, by way of example electro-thermal furnaces, are frequently used in industrial energy distribution networks. Energy is stored in the form of thermal energy which renders it possible within specific limits, by way of example within a cycle time period of a few 100 s, to achieve flexibility with respect to time when supplying electrical energy. A load is operated at its rated output within the cycle time period depending upon the average energy to be supplied for a control time period and is switched off for the remainder of the cycle time period. When the control time periods are suitably established within the cycle time period, it is possible to configure the summated consumption of a plurality of loads accordingly in a uniform manner. A corresponding example for a procedure of this type is described by way of example in the patent document EP 0563790 A2.

It has proven to be disadvantageous that despite optimizing the load distribution, the summated loading graph is frequently undesirably irregular over a cycle time period and that possibly a longer time period can be specified for calculating the optimization procedure.

SUMMARY

An exemplary control apparatus for an energy distribution system is disclosed, the energy distribution system includes a connection to an alternating current supply system, and a plurality of predetermined loads, each having an energy storage capacity and electrically connected by a respective switching device to the alternating current supply system for a duration of a half-wave or a whole number times of said half-wave and said predetermined loads are operated at their rated output when connected, the apparatus comprising: a processor configured to: control the respective switching devices such that the respective loads are supplied from the alternating current supply system for a respective control time period within a predetermined common cycle time period of 1 s to a few 100 s with a respective predetermined magnitude of electrical energy that is averaged over a time period; and establish a start and end of the respective control time periods within the common cycle time period prior to a start of said common cycle time period such that during the common cycle time period an electrical loading on the alternating current supply system by the respective loads is optimized to create a substantially constant loading graph, wherein optimization of the respective loads is based on at least one load in lieu of a continuous control time period at least two non-continuous block time periods of an equal total duration.

An exemplary method for controlling an energy distribution system is disclosed, the energy distribution system having a connection to an alternating current supply system and a plurality of predetermined loads including an energy storage capacity, each predetermined load being electrically connected to the alternating current supply system by a respective switching device for a duration of a half-wave or a whole number times said half-wave and said predetermined loads are operated at their rated output when connected, said method comprising: in a processor of a control apparatus: providing a duration of a respective cycle time period of 1 s to a few 100 s; determining a respective predetermined magnitude of electrical energy with which each of the loads is to be supplied from the alternating current supply system averaged over the cycle time period; ascertaining (e.g., determining) a resultant duration of a respective control time period for each predetermined load; iteratively optimizing a start of the respective control time periods within the cycle time period with respect to a substantially constant graph of the electrical loading on the alternating current supply system by the predetermined loads, and based on substituting a control time period by multiple summated equal length block time periods, wherein the start and the duration of the respective block time periods are determined; and controlling the switching devices according to the optimized start and duration of the control time periods or the block time periods from the starting time of the cycle time period.

BRIEF DESCRIPTION OF THE DRAWINGS

The disclosure, further embodiments and further advantages are to be described in detail with reference to the exemplary embodiments illustrated in the drawings in which.

DETAILED DESCRIPTION

Exemplary embodiments of the present disclosure provide a control apparatus and corresponding method that render it possible to further improve the load distribution. The control apparatus is provided for the purpose of controlling the respective switching devices in such a manner that the respective loads are supplied from the alternating current supply system for a respective control time period within a predetermined common cycle time period with a respective predetermined magnitude of electrical energy that is averaged over a period and wherein the control apparatus is provided for the purpose of establishing the start and end of the respective control time periods within the common cycle time period prior to the start of the common cycle time period in such a manner that during the cycle time period the electrical loading on the alternating current supply system by the loads is optimized to create a substantially constant loading graph.

According to an exemplary embodiment of the present disclosure, the control apparatus is provided for establishing and taking into consideration within the scope of the optimization procedure for at least one load in lieu of a continuous control time period at least two non-continuous block time periods of an equal total duration.

Exemplary embodiments of the present disclosure provide for deviating from the known multiple block time periods of equal summated length that are provided within a cycle time period in lieu of a single control time period of a predetermined duration, which is derived from the average electrical output to be supplied. This is rendered possible by the energy storage capability of the loads, as a result of which it is possible to both divide and also displace the control time period of the loads within a cycle time period. Cycle time periods can last no more than a few 100 s. It is possible to store by way of example mechanical, thermal or electrical energy. This produces an additional flexibility during the subdivision of the different loads within the scope of the optimization procedure. Under certain conditions, those loads that have a control time period that can be freely selected in the cycle time period are regarded as loads that have an energy storage capability. The number of loads is an energy distribution network is by way of example 20 to 100, wherein their respective output is by way of example in the region of a few kW up to more than 1 MW.

An exemplary optimization procedure of the present disclosure achieves a constant as possible (e.g., substantially constant) summated loading graph of all loads over the cycle time period. This is also to be understood to mean minimizing the maximum consumption, in other words eliminating load peaks.

This flexibility is explained with reference to an exemplary example of an optimization procedure that can be performed for a cycle time period of by way of example 1 s to a few 100 s. The magnitude of energy that is to be supplied to each load averaged over the cycle time period is known and places demands by way of example on technical aspects of the production procedure. This is initially used to determine a respective specified control time period for which the respective load is to be switched on within the cycle time period, wherein the position of the control time period has initially not yet been determined.

In a subsequent step, the loads are arranged in an order of precedence in which they are to be taken into consideration during the optimization procedure. This renders it possible by way of example to prioritize loads that have a high energy specification. The point in time at which the maximum prioritized load is switched on during the control time period occurs at the start of the cycle time period. Subsequently, the point in time at which a load is switched on during the control time period that is still acceptable with respect to time in the remaining cycle time period is immediately after the end of this control time period.

According to an exemplary embodiment of the present disclosure, after determining the point in time at which a load is switched on during the control time period the summated loading graph of all previously established loads is formed and it is established in which time period of the cycle time period a "loading dip" occurs. In the next step, it is determined at which point in time a load is switched on during the control time period is suitable for filling the "loading dip". The difficulty that arises in this case is that in each case suitable control time periods ideally also include a preferred duration that renders it possible to completely fill a "loading dip".

By virtue of subdividing a control time period of a predetermined length into multiple block time periods of equal summated duration, on the one hand the average electrical energy supplied to a load remains constant and on the other hand the duration of a block time period can be freely selected so that "loading dips" can be filled accurately with a block time period that is adjusted accordingly with respect to time. It can be possible in this manner to achieve a further improved loading graph over the cycle time period. Moreover, a result can be achieved more rapidly because the number of possible different solutions with a sufficiently constant loading graph is greater.

However, a plurality of further optimization methods that are likewise improved by introducing block time periods is feasible.

In the context of the exemplary embodiments of the present disclosure, the term "optimization" is not to be understood in the strictly mathematical sense, namely that the best of all possible solutions is to be found. On the contrary, each solution that includes a loading graph that is to be defined as being sufficiently constant is to be regarded as being optimal.

The respective point in time at which a load is switched on is determined by the control apparatus prior to the starting time of a cycle time period. A control apparatus is a computing device having a working memory that has corresponding interface options for controlling by way of example the switching devices. According to an exemplary embodiment, a communication device is also provided, by which it can be possible to parameterize the control apparatus. A corresponding program product is provided in the memory of the control apparatus and the corresponding program produce performs the optimization procedure. Once the optimization procedure is completed, the control apparatus controls the switching devices according to the determined time periods from the start of the cycle time period.

The switching devices render it possible to completely separate a load from the alternating current supply network for the duration of at least a half-wave or rather a half period length. In the case of a network frequency of 50 Hz, this duration is a half-wave of 10 ms.

According to another exemplary embodiment of the present disclosure, the control apparatus is provided for the purpose of taking into consideration additional data from the associated load when determining the block time periods and the data contains the information regarding whether and how many block time periods within the common cycle time period are maximally admissible for the respective load.

Depending upon the type of load and its importance in a production process, it can prove to be disadvantageous to subdivide a control time period into multiple block time periods. Therefore, an exemplary embodiment provided herein provides for supplying additional information data to the control apparatus to exclude a load during the optimization procedure by way of example from the block formation. Additional data can be supplied to the control apparatus by way of example by inputting a corresponding parameter in the memory of the control device, data of this type can however also be supplied by way of a communication channel directly from a control device of a respective load. The latter provides an advantage if the boundary conditions for a load change in the production process, by way of example as an electric furnace heats up, in comparison to its stationary operation.

According to yet another exemplary embodiment of the present disclosure, the additional data from the respective load contains information as to which minimal duration of a block time period is admissible for the respective load. Depending upon the type of load and its importance in a production process, it can prove to be disadvantageous if a minimal duration of a block time period is not achieved, by way of example if it is below a value of 100 ms. Such a failure to achieve a minimal duration can be prevented in this manner during the optimization procedure.

According to an exemplary embodiment of the present disclosure, the control apparatus is provided for the purpose of determining and applying control time periods or block time periods for a plurality of successive cycle time periods. Consequently, a continuous operation of the control apparatus or rather of the energy distribution network controlled by the control apparatus is ensured.

According to still another exemplary embodiment of the present disclosure, the control apparatus is provided for the purpose of taking into consideration different predetermined magnitudes of electrical energy for a respective load during successive cycle time periods. It can be advantageous during dynamically changing production processes to dynamically adapt the default parameters in this manner.

It is likewise possible to provide that the length of two successive cycle time periods is adjusted dynamically with respect to one another, by way of example to provide a first cycle time period with a length of 50 s and to provide the subsequent cycle time period with a length of 75 s.

In accordance with another exemplary embodiment of the present disclosure, the control apparatus is provided for the purpose of controlling semiconductor-based switching devices, such as thyristor-based switching devices. Thyristors are extraordinarily suitable owing to their switching behaviour to switch through or block in each case complete half-waves of voltage of the alternating current supply network.

According to an exemplary embodiment of the present disclosure, a method for controlling an energy distribution system that is designed such that it includes a connection to an alternating current supply system and also includes a plurality of predetermined loads that have an energy storage capacity and can be connected as specified in each case by a respective switching device in an electrical manner for the duration of a half-wave or a whole number times the half-wave to the alternating current supply system and the loads are operated at their rated output when connected, the method including the following steps, providing the duration of a respective cycle time period, determining a respective predetermined magnitude of electrical energy with which each of the loads is to be supplied from the alternating current supply system averaged over the cycle time period, ascertaining (e.g., determining) the resultant duration of a respective control time period for each of the loads, iterative optimization of the start of the respective control time periods within the cycle time period with respect to a substantially constant graph of the electrical loading on the alternating current supply system by the loads, wherein the possibility of substituting a control time period by multiple, summated equal length block time periods is taken into consideration and wherein in this case the start and the duration of the respective block time periods are determined, controlling the switching devices according to the optimized start and duration of the control time periods or rather the block time periods from the starting time of the cycle time period.

The resultant advantages of an improved and accelerated load division have already been described within the scope of the control apparatus in accordance with exemplary embodiments of the present disclosure, the control apparatus being provided for the purpose of performing at least the essential steps of this method.

Figure 1:
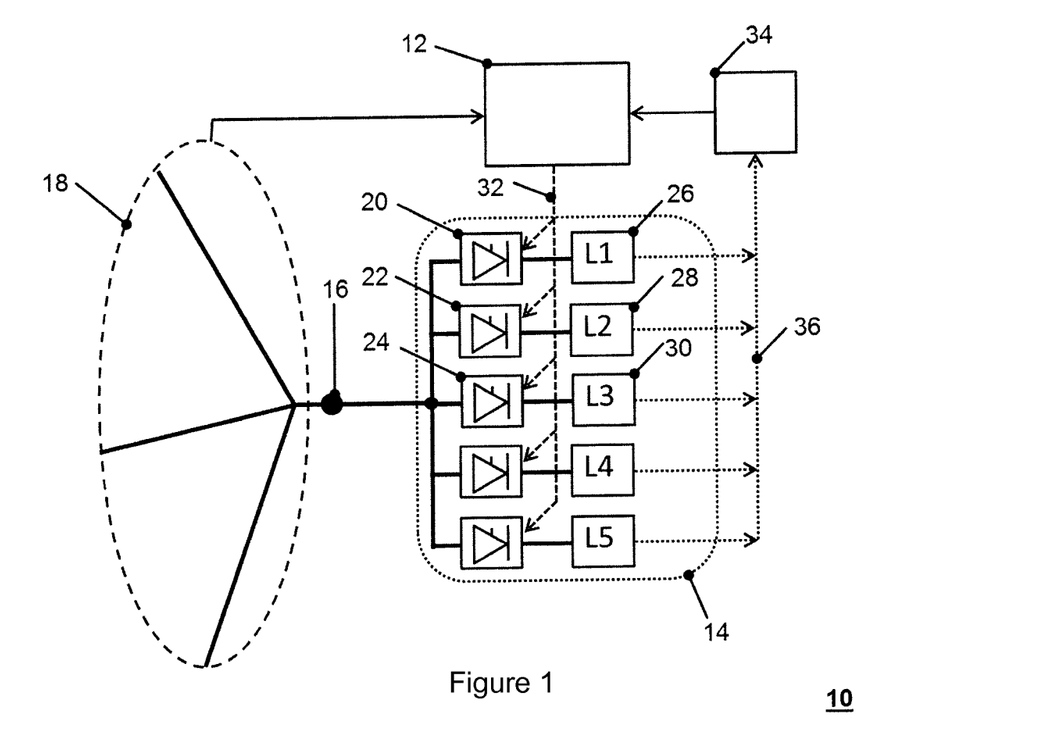
FIG. 1 illustrates an exemplary energy distribution system with the control apparatus in accordance with an exemplary embodiment of the present disclosure.

FIG. 1 illustrates an exemplary energy distribution system with the control apparatus in accordance with an exemplary embodiment of the present disclosure. Namely, FIG. 1 shows an exemplary energy distribution system 14 with a control apparatus 12 in a schematic view 10. The energy distribution system includes multiple loads 26, 28, 30, by way of example electro-thermal loads or also loads that have an electrical energy storage device, which are connected to an electrical supply network 18 by way of a respective switching device 20, 22, 24, by way of example a thyristor controller, by an electrical connection 16.

The control apparatus 12 includes in this case a computing device, which has an optimizing program product stored in its memory, and also a communication interface in order to render it possible to control the switching devices 20, 22, 24 by way of a control connection 32 in a manner that optimizes the loading. Furthermore, the control apparatus 12 receives from a data storage device 34 via the communication interface additional data relating to the loads 26, 28, 30 and this additional data is supplied to the data storage device in a dynamic manner via a data connection 36 directly from a respective control apparatus of the respective loads 26, 28, 30.

According to exemplary embodiments of the present disclosure the control apparatus 12 can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired. The general processor(s) can be configured to include and perform features of the exemplary embodiments of the present disclosure such as, a method for controlling an energy distribution system, and thereby function as a special and unique processor. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

Figure 2:
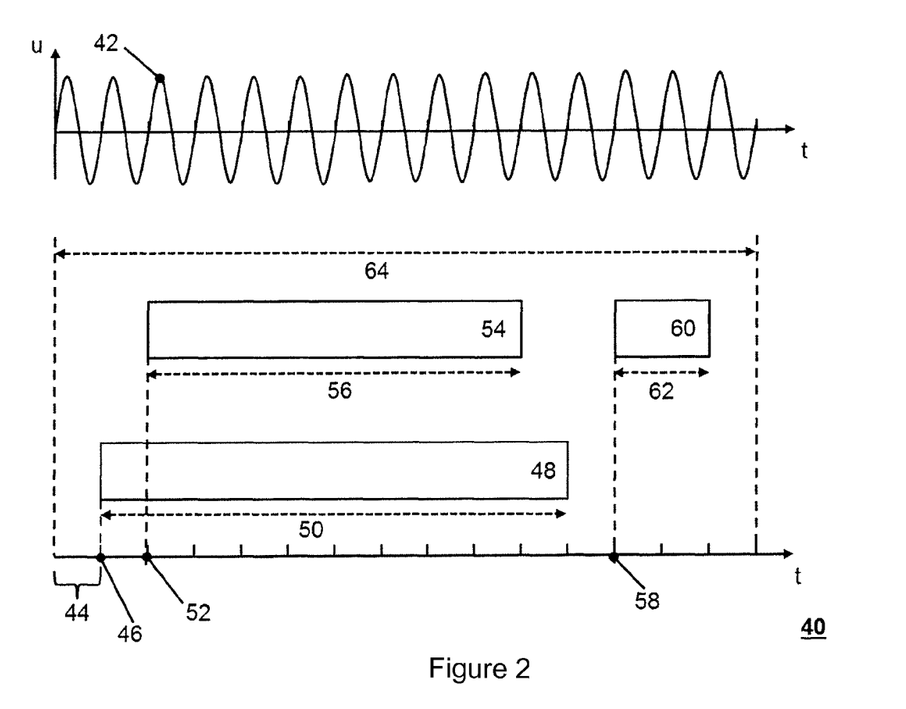
FIG. 2 illustrates an overview image for occurring time periods in accordance with an exemplary embodiment of the present disclosure.

FIG. 2 illustrates an overview image 40 for occurring time periods in accordance with an exemplary embodiment of the present disclosure. The sinusoidal voltage graph 42 of the voltage of an alternating current supply network is illustrated in the upper part of the figure, wherein in the case of a frequency of 50 Hz the length of a half-wave is 10 ms.

A time axis t is drawn in the lower part of the figure and the scale of the time axis corresponds to the duration of a network period 44 with two half-waves. The arrow with the reference numeral 64 indicates the duration of an exemplary cycle time period of 15 periods, at 50 Hz therefore 300 ms.

A control time period 48 commences at 46 after the first network period and continues for the duration of 10 network periods as indicated by the arrow with the reference numeral 50. Within the scope of an optimization procedure in accordance with the disclosure, this control time period 48 can be substituted by way of example by two summated equal length block time periods. The first block time period 54 commences at 52 by way of example after the second network period and continues for the duration 56 of eight network periods and the second block time period 60 commences at 58 by way of example after the thirteenth network period and continues 62 for the duration of two network periods. Summated, duration of ten network periods is produced for each of the two variants.

Figure 3:
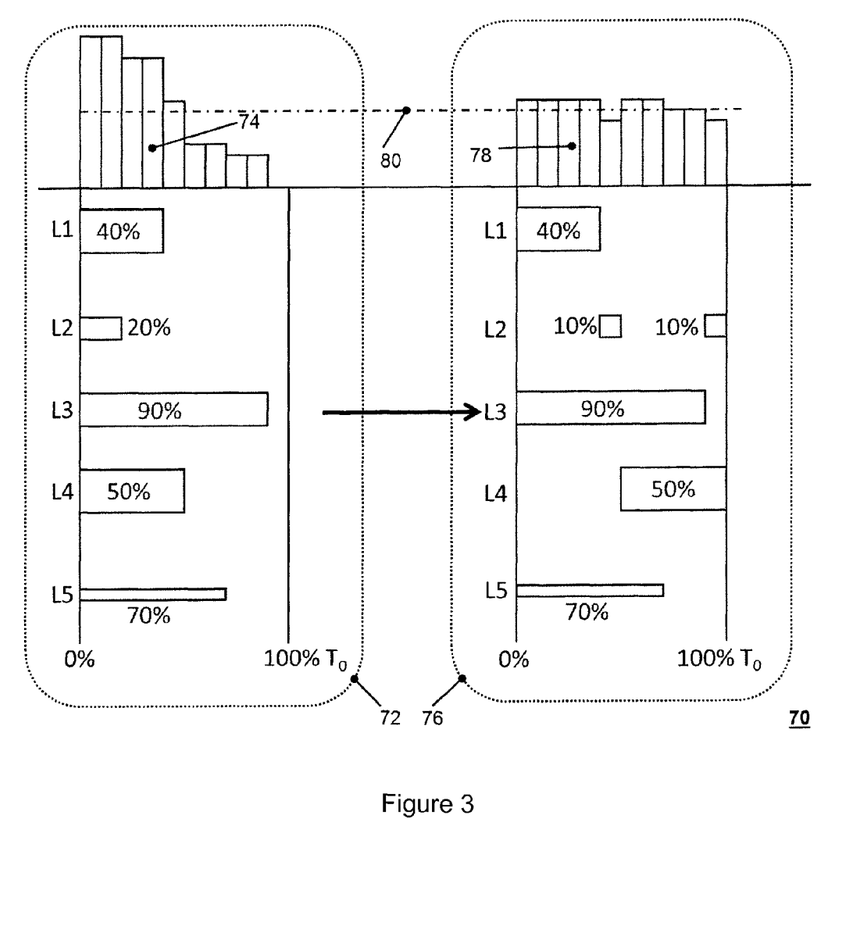
FIG. 3 illustrates exemplary loading graphs of an alternating current supply system in accordance with an exemplary embodiment of the present disclosure.

FIG. 3 illustrates exemplary loading graphs of an alternating current supply system in accordance with an exemplary embodiment of the present disclosure. FIG. 3 illustrates exemplary loading graphs of an alternating current supply system in an illustration 70. Exemplary loading graphs without any optimization are illustrated in the left-hand region that has the reference numeral 72. Different loads L1, L2, L3, L4, L5 are illustrated as bars one above the other according to the control time period that is determined by the operation involved and amounts in this case to between 20% and 90% of the length $T_0$ of the cycle time period, wherein each bar initially commences at the start of the cycle time period, in other words without any optimization. The thickness of a respective bar corresponds to the rated output of the relevant load so that the area of the bars is ultimately a dimension for the electrical energy conditions of a load within the cycle time period.

The areas of the bars are graphically summated as the loading graph 74 without any optimization, wherein the perpendicular lines illustrate for the sake of clarity a 10% quantization of the cycle time period. It is clearly evident that if the loading is not optimized, the loading graph 74 noticeably fluctuates undesirably about an average value 80.

Exemplary loading graphs with optimization are illustrated in the right hand region with the reference numeral 76. The starting points in time of the control time periods of the loads L1, L3, L4 and L5 or rather of the bars representing the loads are adjusted within the scope of an optimization procedure and this results in the starting time period of the load L4 being displaced by a half cycle time. The control time period of the load L2 is divided into two block time periods and the starting time of each block time period is delayed accordingly.

The summated loading graph 78 with optimization illustrates hardly any fluctuations around the average value 80. Reference should however be made to the fact that an optimization procedure within the scope of the disclosure is not to be regarded as optimization in a strict mathematical sense.

Figure 4:
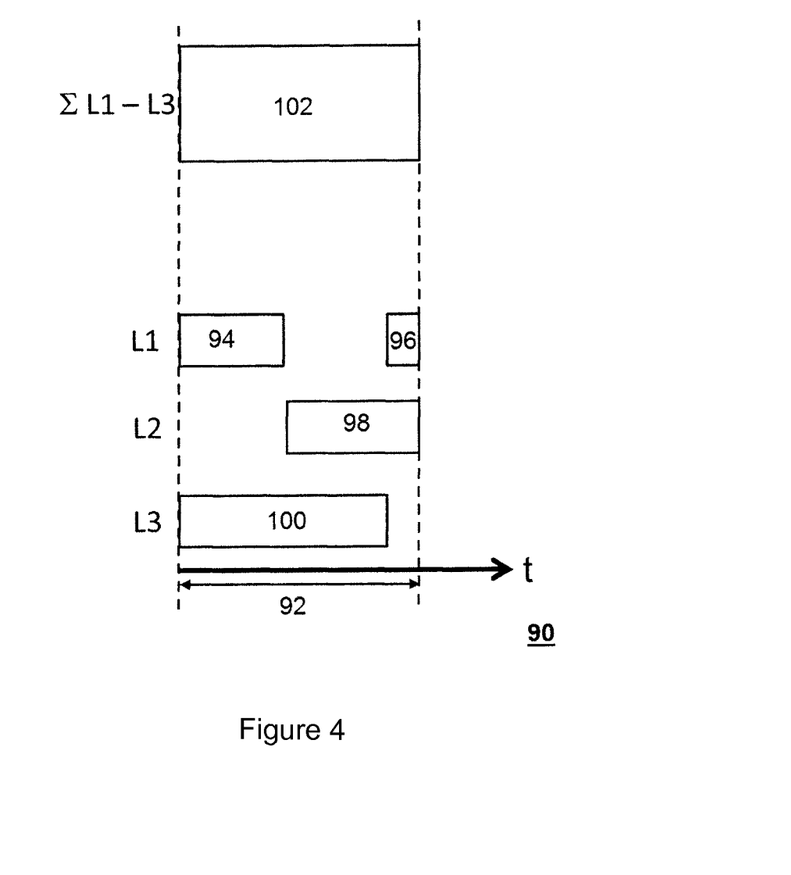
FIG. 4 illustrates a first loading graph with optimization in accordance with an exemplary embodiment of the present disclosure.
Figure 5:
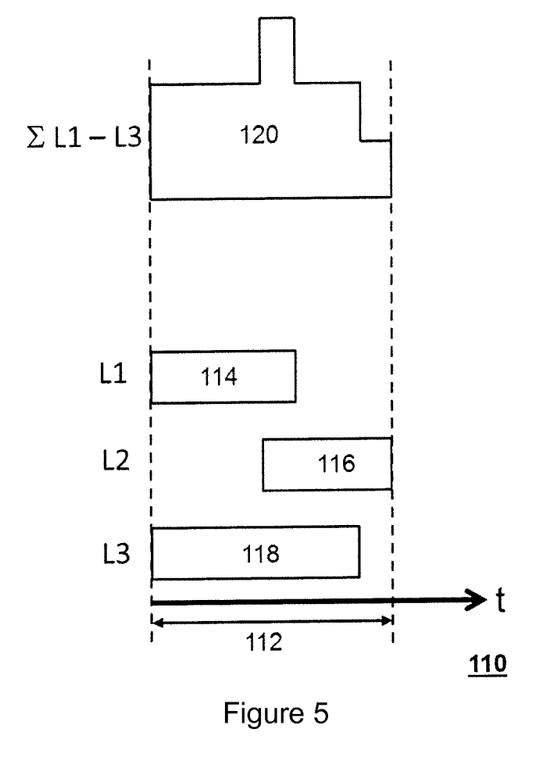
FIG. 5 illustrates a second loading graph with optimization in accordance with an exemplary embodiment of the present disclosure.

FIG. 4 illustrates a first loading graph with optimization in accordance with an exemplary embodiment of the present disclosure. As shown in FIG. 4, illustration 90 includes two continuous control time periods 98, 100 and also two block time periods 94, 96 within a cycle time period 92 for three loads L1, L2, L3, and the time periods are determined in such a manner that the loading graph 102 that is produced as a graphic addition is substantially constant over the cycle time period 92, wherein in this example it is completely constant. A constant graph of this type would not be possible, as illustrated in the subsequent figure, without subdividing the block time periods 94, 96.

FIG. 5 illustrates a second loading graph with optimization in accordance with an exemplary embodiment of the present disclosure. As shown in FIG. 5, illustration 110 includes three continuous control time periods 114, 116, 118 within a cycle loading period 112 for three loads L1, L2, L3, wherein the control time period of the load L1 has not been precisely subdivided into two summated equal length block time periods. It is not possible to achieve a constant progression of the loading graph 120 within the scope of an optimization procedure; on the contrary, owing to the fact that the control blocks unavoidably overlap one another it is not possible to avoid an undesirable fluctuation in the loading graph.

Figure 6:
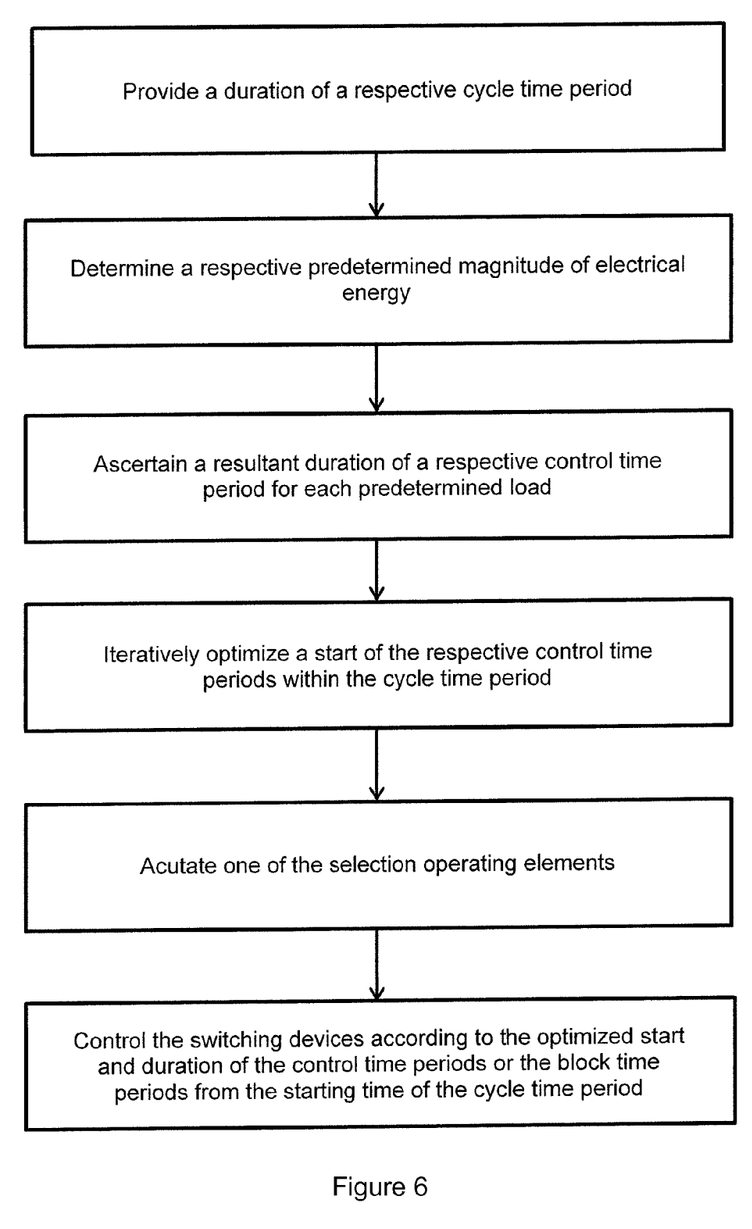
FIG. 6 illustrates a method for controlling an energy distribution system optimization in accordance with an exemplary embodiment of the present disclosure.

FIG. 6 illustrates a method for controlling an energy distribution system optimization in accordance with an exemplary embodiment of the present disclosure. The energy distribution system includes a connection to an alternating current supply system and a plurality of predetermined loads including an energy storage capacity. Each predetermined load can be electrically connected to the alternating current supply system by a respective switching device for a duration of a half-wave or a whole number times said half-wave and said predetermined loads are operated at their rated output when connected. In executing the method, the control apparatus is configured to provide a duration of a respective cycle time period of 1 s to a few 100 s. A respective predetermined magnitude of electrical energy is determined. The electrical energy is to be supplied to each load from the alternating current supply system and is averaged over the cycle time period. A resultant duration of a respective control time period for each predetermined load is ascertained. The control apparatus iteratively optimizes a start of the respective control time periods within the cycle time period with respect to a substantially constant graph of the electrical loading on the alternating current supply system by the predetermined loads. The optimization is based on substituting a control time period by multiple summated equal length block time periods, wherein the start and the duration of the respective block time periods are determined. The switching devices are controlled according to the optimized start and duration of the control time periods or the block time periods from the starting time of the cycle time period.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE NUMERALS

10 Exemplary energy distribution system having a control apparatus
12 Control apparatus
14 Energy distribution system
16 Connection
18 Alternating current supply system
20 First switching device
22 Second switching device
24 Third switching device
26 First load
28 Second load
30 Third load
32 Control connection
34 Data storage device
36 Data connection
40 Overview image—time periods
42 Voltage graph—alternating current supply network
44 Network periods with two half-waves
46 Start of control time period
48 Control time period
50 Duration of control time period
52 Start of first block time period
54 First block time period
56 Duration of first block time period
58 Start of second block time period
60 Second block time period
62 Duration of second block time period
64 Cycle time period
70 Exemplary loading graphs of an alternating current supply system
72 Load graph and loading graph without optimization
74 Loading graph without optimization
76 Load graph and loading graph with optimization
78 Loading graph with optimization
80 Loading averaged over time
90 Exemplary load graph with optimization in accordance with the disclosure
92 Cycle time period
94 First block time period of load L1
96 Second block time period of load L1
98 Control time period of L2
100 Control time period of L3
102 Loading graph over the cycle time period
110 Exemplary load graph with optimization in accordance with the prior art
112 Cycle time period
114 Control time period of L1
116 Control time period of L2
118 Control time period of L3
120 Loading graph over cycle time period

What is claimed is:

1. A control apparatus for an energy distribution system, in which the energy distribution system includes a connection to an alternating current supply system and to a plurality of predetermined loads, each predetermined load having an energy storage capacity and being electrically connected by a respective switching device to the alternating current supply system for a duration of a half-wave or a whole number times of the half-wave, the predetermined loads being operated at their rated output when connected, the control apparatus comprising:
a processor configured to:
control the respective switching devices such that the plurality of predetermined loads are supplied from the alternating current supply system for a respective control time period within a predetermined common cycle time period of 1 second to a few 100 seconds with a respective predetermined magnitude of electrical energy that is averaged over a time period; and
establish a start and end of each respective control time period within the common cycle time period prior to a start of the common cycle time period such that during the common cycle time period an electrical loading on the alternating current supply system by the plurality of predetermined loads is optimized to create a substantially constant loading graph,
wherein optimization of the plurality of predetermined loads includes a substitution of (i) a continuous control time period for at least one load of the plurality of predetermined loads with (ii) at least two non-continuous block time periods of an equal total duration for the at least one load.

2. The control apparatus according to claim 1, wherein the processor is configured to determine and apply control time periods or block time periods for a plurality of successive cycle time periods.

3. The control apparatus according to claim 2, wherein the processor is configured to consider different predetermined magnitudes of electrical energy for the at least one load during successive cycle time periods.

4. The control apparatus according to claim 1, wherein the respective switching devices include semiconductor-based switching devices.

5. The control apparatus according to claim 4, wherein the semiconductor-based switching devices include thyristor-based switching devices.

6. A control apparatus for an energy distribution system, in which the energy distribution system includes a connection to an alternating current supply system and to a plurality of predetermined loads, each predetermined load having an energy storage capacity and being electrically connected by a respective switching device to the alternating current supply system for a duration of a half-wave or a whole number times of the half-wave, the predetermined loads being operated at their rated output when connected, the control apparatus comprising:
a processor configured to:
control the respective switching devices such that the plurality of predetermined loads are supplied from the alternating current supply system for a respective control time period within a predetermined common cycle time period of 1 second to a few 100 seconds with a respective predetermined magnitude of electrical energy that is averaged over a time period; and
establish a start and end of each respective control time period within the common cycle time period prior to a start of the common cycle time period such that during the common cycle time period an electrical loading on the alternating current supply system by the plurality of predetermined loads is optimized to create a substantially constant loading graph,
wherein optimization of the plurality of predetermined loads includes a substitution of (i) a continuous control time period for at least one load of the plurality of predetermined loads with (ii) at least two non-continuous block time periods of an equal total duration for the at least one load; and wherein the processor is configured to determine block time periods based on additional data from the at least one load, wherein the additional data contains information regarding whether and how many block time periods within the common cycle time period are maximally admissible for the at least one load.

7. The control apparatus according to claim 6, wherein the additional data from the at least one load contains the information as to which minimal duration of a block time period is admissible for the at least one load.

8. A method for controlling an energy distribution system, the energy distribution system having a connection to an alternating current supply system and to a plurality of predetermined loads, each predetermined load including an energy storage capacity, each predetermined load being electrically connected to the alternating current supply system by a respective switching device for a duration of a half-wave or a whole number times of the half-wave, the predetermined loads being operated at their rated output when connected, the method comprising:

in a processor of a control apparatus:
providing a duration of a respective cycle time period of 1 second to a few 100 seconds;
determining a respective predetermined magnitude of electrical energy with which each of the plurality of predetermined loads is to be supplied from the alternating current supply system averaged over the cycle time period;
ascertaining a resultant duration of a respective control time period for each of the plurality of predetermined loads;
iteratively optimizing a start of each respective control time period within the cycle time period with respect to a substantially constant graph of the electrical loading on the alternating current supply system by the plurality of predetermined loads, wherein optimizing comprises substituting a control time period by multiple summated equal length block time periods, wherein the start and the duration of the respective block time periods are determined; and
controlling the switching devices according to the optimized start and duration of the control time periods or the block time periods from the starting time of the cycle time period.

* * * * *